US008577859B2

(12) United States Patent
Archambault et al.

(10) Patent No.: US 8,577,859 B2
(45) Date of Patent: Nov. 5, 2013

(54) METHOD AND SYSTEM FOR AGGREGATING SEARCHABLE WEB CONTENT FROM A PLURALITY OF SOCIAL NETWORKS AND PRESENTING SEARCH RESULTS

(75) Inventors: Martin-Luc Archambault, Montreal (CA); Sébastien Giroux, Mercier (CA); André-Philippe Paquet, Verdun (CA)

(73) Assignee: Wajam Internet Technologie Inc., Montreal (CA)

( * ) Notice: Subject to any disclaimer, the term of this patent is extended or adjusted under 35 U.S.C. 154(b) by 82 days.

(21) Appl. No.: 13/346,342

(22) Filed: Jan. 9, 2012

(65) Prior Publication Data

US 2013/0179427 A1 Jul. 11, 2013

(51) Int. Cl.
*G06F 17/30* (2006.01)

(52) U.S. Cl.
USPC .......................................... 707/705; 707/706

(58) Field of Classification Search
USPC ................................................ 707/705, 706
See application file for complete search history.

(56) References Cited

U.S. PATENT DOCUMENTS

| | | | |
|---|---|---|---|
| 7,657,523 B2 | 2/2010 | Ebanks | |
| 7,827,176 B2 | 11/2010 | Korte et al. | |
| 7,958,104 B2 | 6/2011 | O'Donnell | |
| 8,019,743 B2 | 9/2011 | Ebanks | |
| 8,121,999 B2* | 2/2012 | Hansen et al. | 707/706 |
| 8,140,566 B2* | 3/2012 | Boerries et al. | 707/769 |
| 2009/0204601 A1 | 8/2009 | Grasset | |
| 2010/0010987 A1* | 1/2010 | Smyth et al. | 707/5 |
| 2010/0250136 A1* | 9/2010 | Chen | 701/300 |
| 2011/0093498 A1 | 4/2011 | Lunt et al. | |
| 2011/0314049 A1* | 12/2011 | Poirier et al. | 707/769 |

OTHER PUBLICATIONS

Horowitz & Kamvar, "The Anatomy of a Large-Scale Social Search Engine", Apr. 26-30, 2010, Raleigh, North Carolina, 10 pages.
Nelson, "Can adding friends on Facebook grow your brain?", Mother Nature Network, [online], [retrieved on Oct. 18, 2011].

* cited by examiner

*Primary Examiner* — Hung Q Pham
(74) *Attorney, Agent, or Firm* — Benoît & Côté Inc.

(57) ABSTRACT

There is disclosed a method and system for presenting indexed search results from a social network, concurrently with customary search results returned by a search engine hosted on a website, to a user performing a search from a user interface of a user device using the search engine. The user is registered on the social network and has connections thereon. The method comprises: indexing data related to users registered on the social network to produce indexed data, the data obtained from the social network hosted on a website different from the website hosting the search engine; receiving a search query along with a user identifier; performing a search on the indexed data specific to the user's connections to obtain indexed search results specific to the user's connections on the social network; and returning to the user device the indexed search results for presentation on the user interface.

12 Claims, 5 Drawing Sheets

METHOD AND SYSTEM FOR AGGREGATING SEARCHABLE WEB CONTENT FROM A PLURALITY OF SOCIAL NETWORKS AND PRESENTING SEARCH RESULTS

BACKGROUND (a) Field

The subject matter disclosed generally relates to web search and presentation tools. More particularly, the disclosure relates to searching users' social networks.

(b) Related Prior Art

Tremendous changes have been occurring in the World Wide Web (the "Web") that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One of the more useful features of the Web and associated forms of communication such as e-mail, instant messaging, chat rooms, social networks and forums is the access to information that is useful in everyday work and social lives. There exists a substantial amount of information accessible on the Web. However, the information obtained by searching the Web is often generic and does not account for the searcher's level of education, location, socioeconomic status or the like. The response to a search of the Web is typically presented to the user by relevancy to the search request and/or other similar criteria which are based the wording of the search request. More often than not, the user is required to review a large amount of information that is not in feet relevant to the user's request. For instance, the user's background or knowledge in the subject matter may not match that of many of the search request results. Some information may be too detailed or technical while other information may be too generic. Likewise, if a user submits a query to a message board, blog, forum or similar on-line interactive site, many of the responses to the user's request will be from people who come from different backgrounds with different tastes and varying levels of knowledge in particular areas. This is particularly true for queries that are social in nature, wherein the responses to the request are more opinion than fact. Although some responses could be highly relevant, a large number of the responses can have low usefulness or relevance to the user's request. A user could also submit inquiries to their friends and family through e-mail, instant messaging or similar methods of communication. However, the responses may be sporadic, have no organization and may be repetitive of other requests made within the social network. Therefore, it is with respect to these considerations and others that the embodiments described herein were made.

There is therefore a need to change how people collect, find and share content on the Web.

SUMMARY

According to an embodiment, there is provided a method for presenting indexed search results from a social network, concurrently with customary search results returned by a search engine hosted on a website, to a user performing a search from a user interface of a user device using the search engine. The user is registered on the social network and has connections thereon. The method comprises: indexing, by a social search server, data related to users registered on the social network to produce indexed data, the data obtained from the social network hosted on a website that is different from the website hosting the search engine; receiving, by the social search server, a search query along with a user identifier from the user device through the search engine; using the search query and the user identifier, performing, by the social server, a search on the indexed data specific to the user's connections to obtain indexed search results specific to the user's connections on the social network; returning, by the social search server, to the user device the indexed search results specific to the user's connections; and presenting, on the user interface, the indexed search results specific to the user's connections concurrently with the customary search results returned by the search engine.

According to an aspect, the performing a search comprises performing a search on the indexed data specific to the user's connections/friends and on indexed data specific to connections of the user's connections.

According to an aspect, the indexing data comprises indexing pieces of web content related to the users comprising at least one of photos, links, messages, comments, recommendations, and videos.

According to an aspect, the presenting comprises displaying a thumbnail providing a link to each of the photos and/or videos.

According to an aspect, the method further comprises creating, upon selecting a thumbnail, a pop-up window or an area on the user interface displaying the photo and/or video to which the thumbnail is linked.

According to an aspect, the creating a pop-up window or an area on the user interface is performed without redirection to a source website from which the photos and/or videos were previously indexed.

According to an aspect, the method further comprises creating, on the user interface, a button for re-ranking results based on a given criterion.

According to an aspect, the given criterion comprises at least one of: a connection of the user, a social network, recency, and relevancy.

According to an aspect, the method further comprises obtaining an indication of the user's interests from a profile of the user and wherein the performing a search ranks the search results based on the user's interests.

According to an aspect, the indexing data comprises indexing data indicative of information relating to activities of users on the social network website to produced indexed activity data.

According to an aspect, the indexing data further comprises indexing data comprising an indication of the user connection associated with each activity data, that is, the user connection which is the source for each activity data.

According to an aspect, the method further comprises creating a reserved space on the user interface and presenting the indexed search results specific to the user's connections in the reserved space.

According to an aspect, the creating a reserved space takes place at the website hosting the search engine.

According to an aspect, the creating a reserved space takes place on a web browser on the user interface.

According to an aspect, the social network comprises a plurality of social networks and the indexing data thereby comprises indexing data related to users registered on the plurality of social networks.

According to an embodiment, there is provided a social search server for presenting indexed search results from a social network, concurrently with customary search results returned by a search engine hosted on a website, to a user performing a search from a user interface of a user device using the search engine. The user is registered on the social network and has connections thereon. The social search server comprises: an input for receiving a search query along with a user identifier; an indexing engine for indexing data related to users registered on the social network to produce indexed data, the data obtained from the social network hosted on a website that is different from the website hosting the search engine; a search engine using the search query and the user identifier, performing a search on the indexed data specific to the user's connections to obtain indexed search results specific to the user's connections on the social network; and an output for returning to the user device the indexed search results specific to the user's connections for presentation on the user interface concurrently with the customary search results returned by the search engine.

According to an embodiment, there is provided a method implemented on a social search server for presenting indexed search results from a social network, concurrently with customary search results returned by a search engine hosted on a website, to a user performing a search from a user interface of a user device using the search engine. The user is registered on the social network and has connections thereon. The method comprising: indexing data related to users registered on the social network to produce indexed data, the data obtained from the social network hosted on a website that is different from the website hosting the search engine; receiving a search query along with a user identifier from the user device through the search engine; using the search query and the user identifier, performing a search on the indexed data specific to the user's connections to obtain indexed search results specific to the user's connections on the social network; and returning to the user device the indexed search results specific to the user's connections for presentation on the user interface concurrently with the customary search results returned by the search engine.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
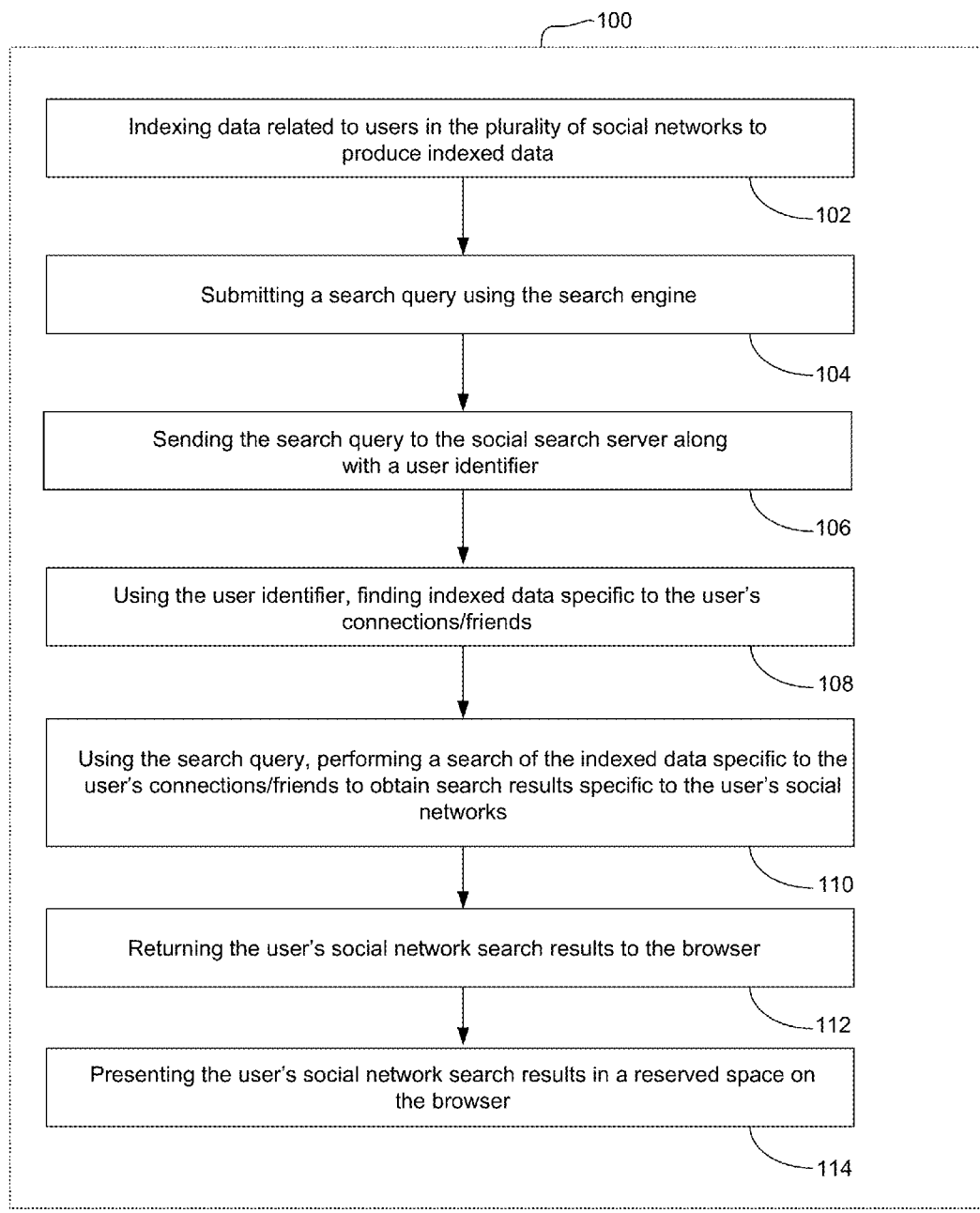
FIG. 1 is a flowchart of a method for presenting indexed search results from a social network in accordance with an embodiment.

Referring to FIG. 1, there is a shown an embodiment of a method 100 for presenting indexed search results from a social network, concurrently with customary search results returned by a search engine hosted on a website, to a user performing a search from a user interface of a user device using the search engine.

In an embodiment, the method is performed in the context where the user is registered on a plurality of social networks. The method therefore aggregates searchable web content (i.e., social data) from a plurality of social networks. The user is registered on one or more social networks and has connections (e.g., friends) thereon.

Method 100 comprises the steps outlined hereafter. At step 102, a social search server indexes data related to users registered on the social network to produce indexed data, the data obtained from the social network hosted on a website that is different from the website hosting the search engine (i.e., the website hosting the search engine and the website hosting the social network are different). The indexing by the social search server is meant to include collecting, parsing, and storing of data available from the one or more social networks to facilitate fast and accurate information retrieval.

At step 104, the user submits a search query using the search engine. An extension on the search engine (see details about the extension below) obtains the search query and forwards it to the social search server. At step 106, the social search server receives the search query along with a user identifier from the user device through the search engine. At step 110, the social search server, using the search query, performs a search of the indexed data specific to the user's connections/friends to obtain search results specific to the user's connections on the social network. At step 112, the social search server returns to the user device the indexed search results specific to the user's connections. At step 114, the user interface presents the indexed search results specific to the user's connections concurrently with the customary search results returned by the search engine.

According to an embodiment, the step of performing a search 110 comprises performing a search on the indexed data specific to the user's connections/friends and on indexed data specific to connections of the user's connections (e.g., friends or friends).

According to an embodiment, the step of indexing data 102 comprises indexing pieces of web content which includes, but is not limited to, photos, links, messages and/or videos. In the case where the pieces of web content are photo and/or videos, the step of presenting 114 comprises displaying a thumbnail providing a link to each of the photos and/or videos.

According to an embodiment, method 100 further comprises creating, upon selecting a thumbnail, a pop-up window or an area on the user interface displaying the photo and/or video to which the thumbnail is linked. The displaying a pop-up window or an area on the user interface may be performed without redirection to the source website from which the photos and/or videos were previously indexed.

According to an embodiment, method 100 further comprises creating, on the user interface, a button in the reserved space for re-ranking results based on a given criterion.

According to an embodiment, the given criterion comprises at least one of: a connection of the user, a social network, recency, and relevancy. In a specific embodiment, relevancy is calculated using various pieces of information ("signals") such as title, description, URL, messages, comments, recency, etc. Different weights are associated to each piece of information. Other pieces of information include "social signals" such as how much interaction there is with a user on a social network wherein the greater the interaction, the higher the user's results will be ranked. Also, the greater a user's connection is ranked as an "expert" for the submitted search query, the higher the "expert" will be listed in the search results. A search result may also be ranked based on how many times a link/content has been shared on the social network.

According to an embodiment, method 100 further comprises obtaining an indication of the user's interests from a profile of the user and wherein the performing a search ranks the search results based on the user's interests (like/dislike).

According to an embodiment, the step of the indexing data 102 comprises indexing data indicative of information relating to activities of users on the social network website to produced indexed activity data. The indexing data step 102 further comprises indexing data comprising an indication of the user connection associated with each activity data, that is, the user connection which is the source for each activity data.

According to an embodiment, method 100 further comprises creating a reserved space on the user interface and presenting the indexed search results specific to the user's connections in the reserved space. The creating a reserved space may take place at the website hosting the search engine. Alternatively, the creation of a reserved space may take place on a web browser on the user interface.

The creation of a reserved space on the user interface may be performed in a variety of ways. On a browser on the user interface, a widget, added by one of an extension, a plug-in, app, or an add-on loaded on the browser, can create the reserved space. The reserved space could also form part of a tool bar, search bar, side bar or notification window associated with the browser. Another way for creating a reserved space on the user interface is to publish a widget that can be installed by the owners of website hosting search engines or other content publishing websites (so-called "Widget for Publishers"). For example, a news source could install the widget on its website and a registered user of the site would see what his connections have shared concerning the subject being displayed on a web page.

Figure 2:
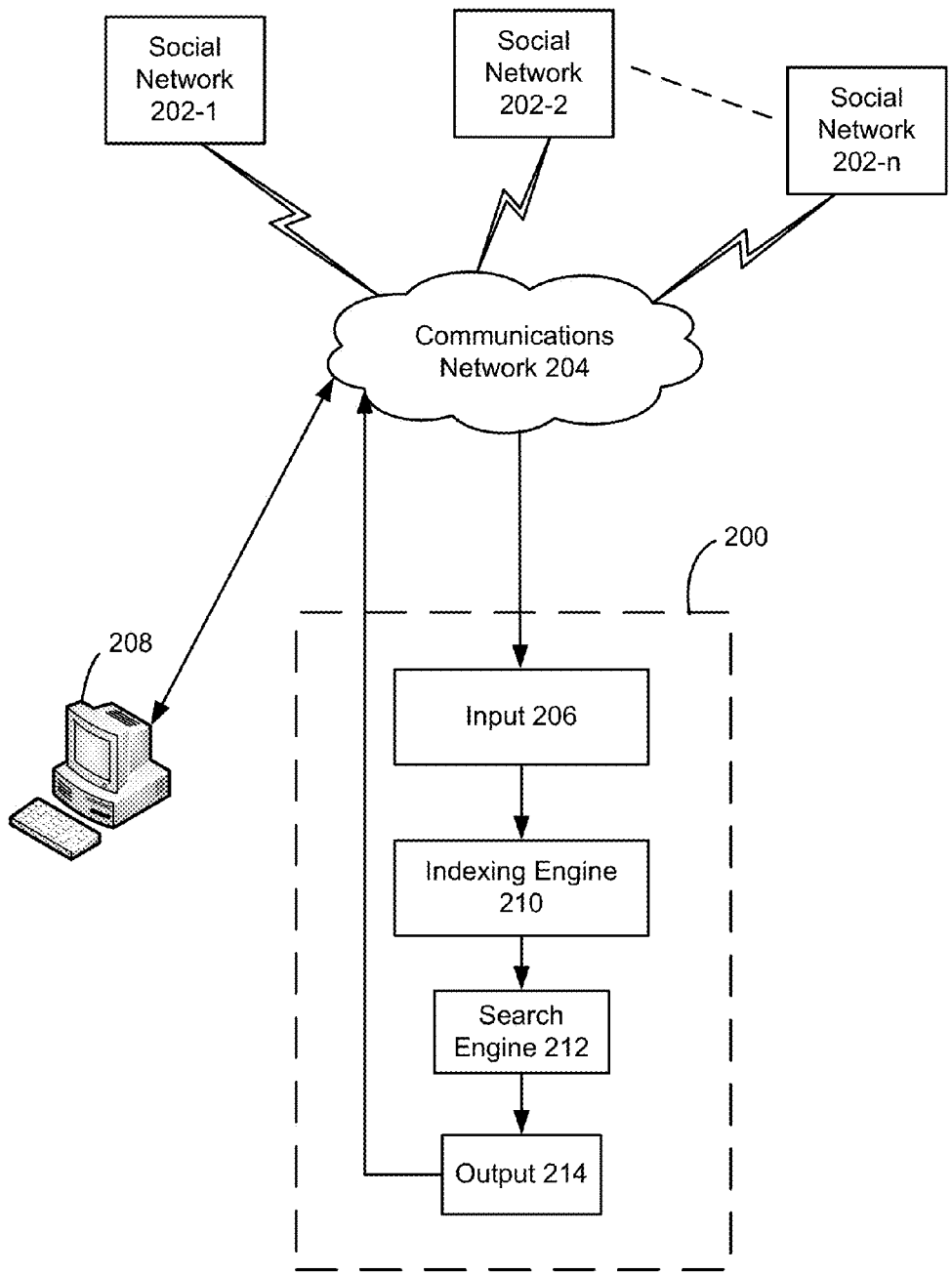
FIG. 2 is a block diagram of an exemplary social search server for presenting indexed search results from a social network in accordance with an embodiment.

Now turning to FIG. 2, there is shown is a block diagram of an exemplary social search server 200 and its immediate operating environment for presenting indexed search results from a social network according to the methods described herein.

According to an embodiment, the social search server 200 comprises an input 206, an indexing engine 210, a search engine 212 and an output 214. The social search server 200 may also include a database (not shown) or have access to an external database.

The input 206 is for receiving a search query from the user computer device 208 along with a user identifier from a widget on the browser of the user computer device 208. The indexing engine 210 is for indexing data related to users in the plurality of social networks 202 and thereby to produce indexed data which can be stored in a database (not shown, internal or external to the social search server 200)

The search engine 212 uses the user identifier for finding indexed data specific to the user's connections. The search engine 212 uses the search query for performing a search of the indexed data specific to the user's connections/friends to obtain search results specific to the user's social networks (the user's social network search results).

The output 214 returns the user's social network search results to the browser the user computer device 208 where the widget will display them in a reserved space.

The social search server 200 obtains data concerning a user from one or more social networks 202 over a communication network 204 such as the Internet, or any other type of wired and/or wireless communication networks. Examples of social media networks include but are not limited to: Facebook, LinkedIn, Google Plus and Google related networks, Twitter, Foursquare, MySpace, email such as Gmail and Hotmail, etc. The data obtained from the social networks includes activity data such as sharing, commenting, liking/recommending, posting, etc.

The social search server 200 is also connected to the user computer device 208 over communication network 204. In general, the social search server 200 collects the data from the remote servers of the social networks 202, processes the data locally and then provides the results to the user computer device 208 over the communication network 204. In the case where the data is unstructured or semi-structured, e.g., HTML content, the social search server 200 scrapes the data from the remote servers of the social networks 202.

In an embodiment, the user of the user computer device 208 has to open an account and create a user profile with the social search server 200. The user may link their profile with the social search server 200 to one or more accounts at one or more social networks 202.

In an embodiment, the social search server 200 updates its content on a regular basis e.g. real-time, daily and/or every time a user computer device 208 makes a request, to provide the user computer device 208 with real-time or nearly real-time results and recommendations.

Figure 3:
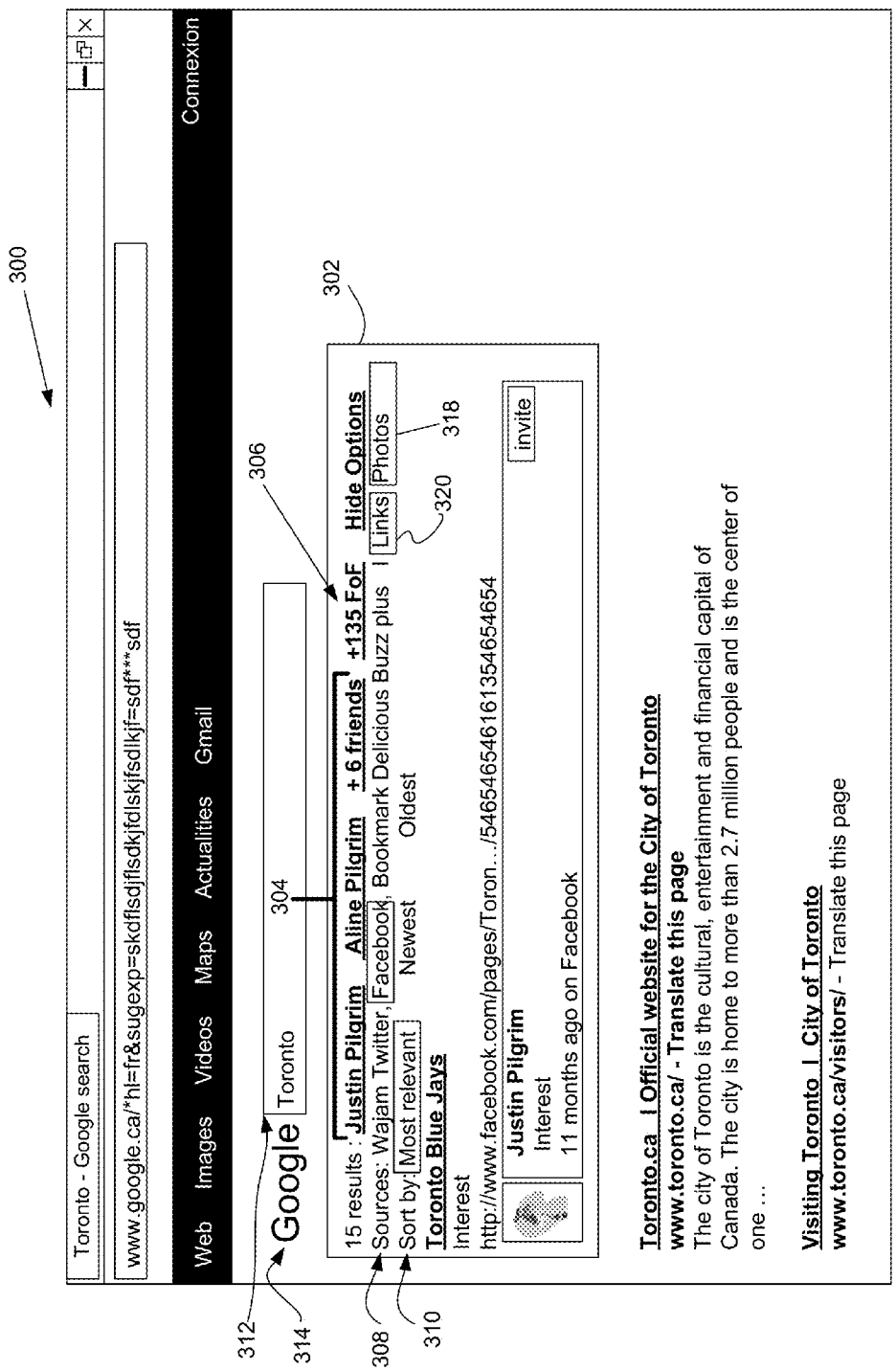
FIG. 3 is a screen shot of a web browser interface on which the method of FIG. 1 is embodied.

Now turning to FIG. 3, there is shown a screen shot of a web browser 300 implemented on the user computer device 208 (see FIG. 2). Examples of browsers include: Internet Explorer, Safari, Firefox, Google Chrome, Opera, etc. The web browser 300 comprises a reserved space 302 for presenting the user's social network search results and connections 304 (e.g., friends) of the user as well as connections of the connections of the user 306 (e.g., friends of friends: FoF).

The web browser 300 also provides the capability to select the user's social networks (sources 308) and to sort the search results various ways using the "Sort by" 310 tools. For example, search results can be sorted by their relevance ("Most relevant") or by recency ("Newest" or "Oldest" first).

The web browser 300 comprises a search query box 312 and provides access to a search engine 314. Examples of search engines include: Google, Yahoo!, Bing, etc.;

Finally, the web browser 300 provides a selection tool 318 for requesting to show or hide thumbnails of photos from the indexed data in the user's social network and a selection tool 320 for requesting to show or hide links from the indexed data in the user's social network.

Figure 4:
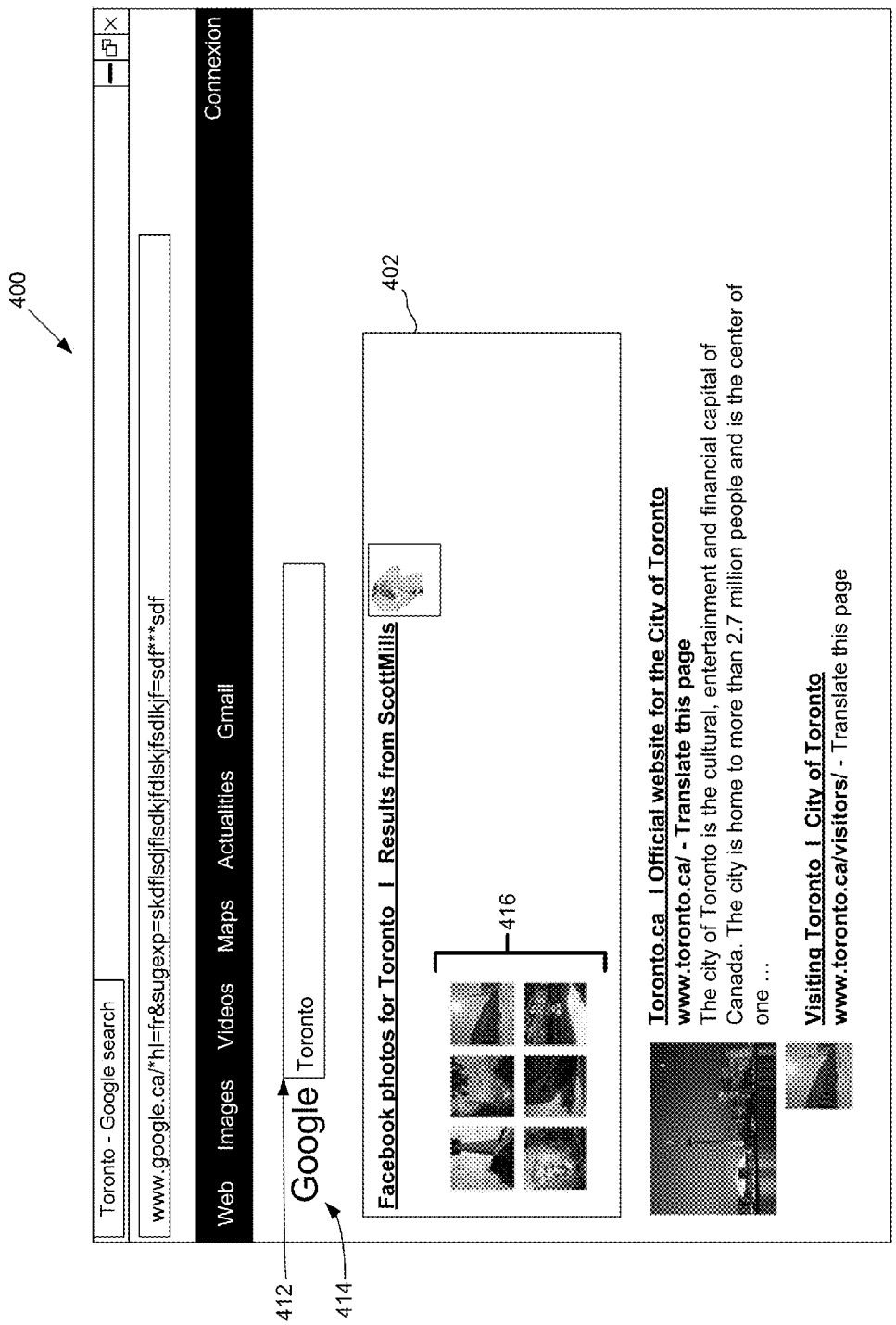
FIG. 4 is another screen shot of a web browser interface on which the method of FIG. 1 is embodied.

Now turning to FIG. 4, there is shown a screen shot of another web browser 400 implemented on the user computer device 208 (see FIG. 2). The web browser 400 comprises a reserved space 402 for presenting the user's social network search results which include photos in this case. According to an embodiment, an overlaid pop-up window 422 displaying a photo which is linked to a thumbnail.

The web browser 400 comprises a search query box 412 and provides access to a search engine 414. Finally, web browser 400 shows thumbnails 416 of photos from the indexed data in the user's social network.

Figure 5:
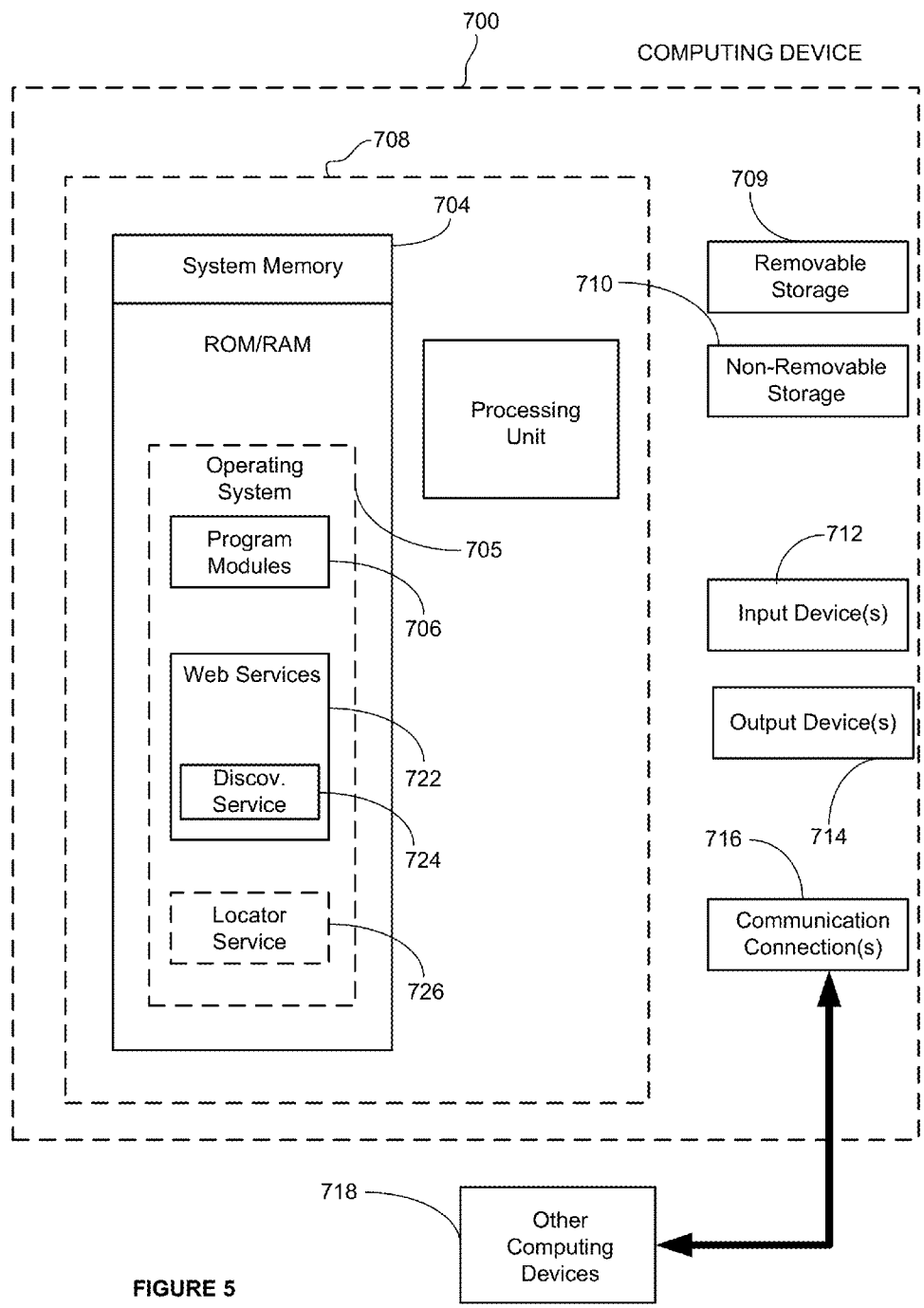
FIG. 5 illustrates a block diagram of an exemplary computing environment.

FIG. 5 and the associated discussion are intended to provide a brief, general description of a suitable computing environment in which embodiments of the social search server 200 and of the user computer device 208 (see FIG. 2) may be implemented. It should be noted that the user computer device 208 may include, but is not limited to, one of a desktop, a laptop, an IPad, an IPhone, a smart phone, or any computing device having an operating system which can implement the embodiments described herein.

With reference to FIG. 5, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer or a server (such as the social search server 200). This basic configuration is illustrated in FIG. 5 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 5 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators. These human operators need not be collocated with each other, but each can be only with a machine that performs a portion of the program.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for presenting indexed search results from a social network, concurrently with customary search results returned by a search engine hosted on a website, to a user performing a search from a user interface of a user device using the search engine, the user being registered on the social network and having connections thereon, the method comprising:
   indexing, by a social search server, data related to users registered on the social network to produce indexed data, the data obtained from the social network hosted on a website that is different from the website hosting the search engine, the social search server being different from the search engine;
   installing a widget on a web browser used for accessing websites on the user device, the widget forwarding to the social search server a user identifier along with a search query entered on the website associated with the search engine;
   receiving, by the social search server, the search query along with the user identifier from the user device;
   using the search query and the user identifier, performing, by the social server, a search on the indexed data specific to the user's connections to obtain indexed search results specific to the user's connections on the social network;
   returning, by the social search server, to the user device the indexed search results specific to the user's connections;
   receiving customary search results returned by the search engine in response to the search query;
   using the widget installed on the web browser, reserving a space on the user interface for the indexed search results; and
   presenting, on the user interface, the indexed search results specific to the user's connections concurrently with the customary search results returned by the search engine, the indexed search results being presented in the space reserved by the widget on the user interface;
   wherein the indexed search results and the customary search results are concurrently presented on websites accessed from the browser having the widget installed thereon.

2. The method of claim 1, wherein the performing a search comprises performing a search on the indexed data specific to the user's connections and on indexed data specific to connections of the user's connections.

3. The method of claim 1, wherein the step of indexing data comprises indexing pieces of web content related to the users comprising at least one of photos, links, messages, comments, recommendations, and videos.

4. The method of claim 3, wherein the presenting comprises displaying a thumbnail providing a link to each of the photos and/or videos.

5. The method of claim 4, further comprising creating, upon selecting a thumbnail, a pop-up window or an area on the user interface displaying the photo and/or video to which the thumbnail is linked.

6. The method of claim 5, wherein the creating a pop-up window or an area on the user interface is performed without redirection to a source website from which the photos and/or videos were previously indexed.

7. The method of claim 1, further comprising creating, on the user interface, a button for re-ranking results based on a given criterion.

8. The method of claim 7, wherein the given criterion comprises at least one of: a connection of the user, a social network, recency, and relevancy.

9. The method of claim 1, further comprising obtaining an indication of the user's interests from a profile of the user and wherein the performing a search ranks the search results based on the user's interests.

10. The method of claim 1, wherein the step of indexing data comprises indexing data indicative of information relating to activities of users on the website of the social network to produced indexed activity data.

11. The method of claim 10, wherein the indexing data further comprises indexing data comprising an indication of the user connection associated with each activity data, that is, the user connection which is the source for each activity data.

12. The method of claim 1, wherein the social network comprises a plurality of social networks and the indexing data thereby comprises indexing data related to users registered on the plurality of social networks.

* * * * *